Nov. 24, 1970    C. W. CALHOUN, JR., ET AL    3,542,621
METHOD AND APPARATUS FOR CONTINUOUSLY LAMINATING A SHEET OF
MATERIAL TO EACH SIDE OF ANOTHER SHEET OF MATERIAL
Original Filed Nov. 19, 1963    2 Sheets-Sheet 1
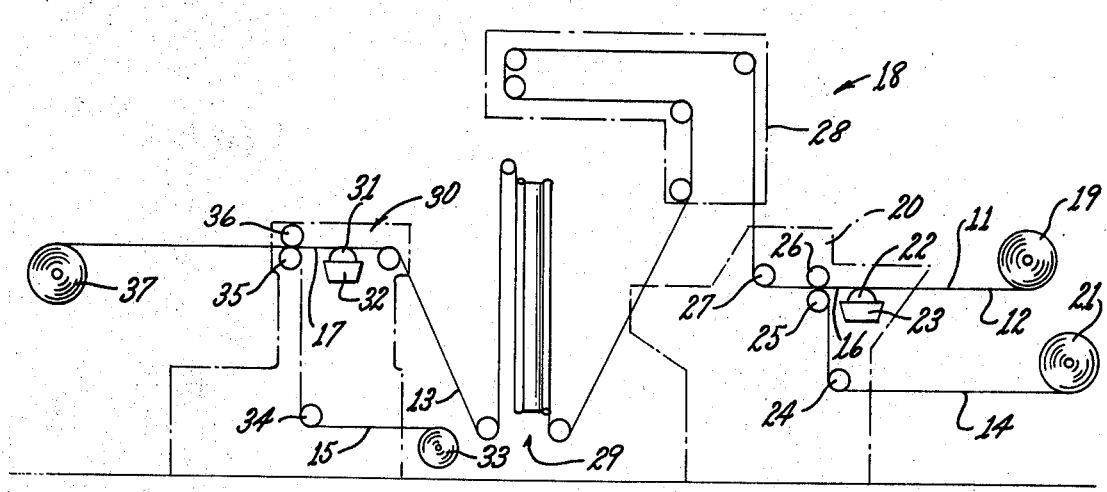
INVENTORS
CLINTON W. CALHOUN, JR
FRANK B. HART, JR.
BY    LLOYD C. EBERHARD, JR.
THEIR ATTORNEYS

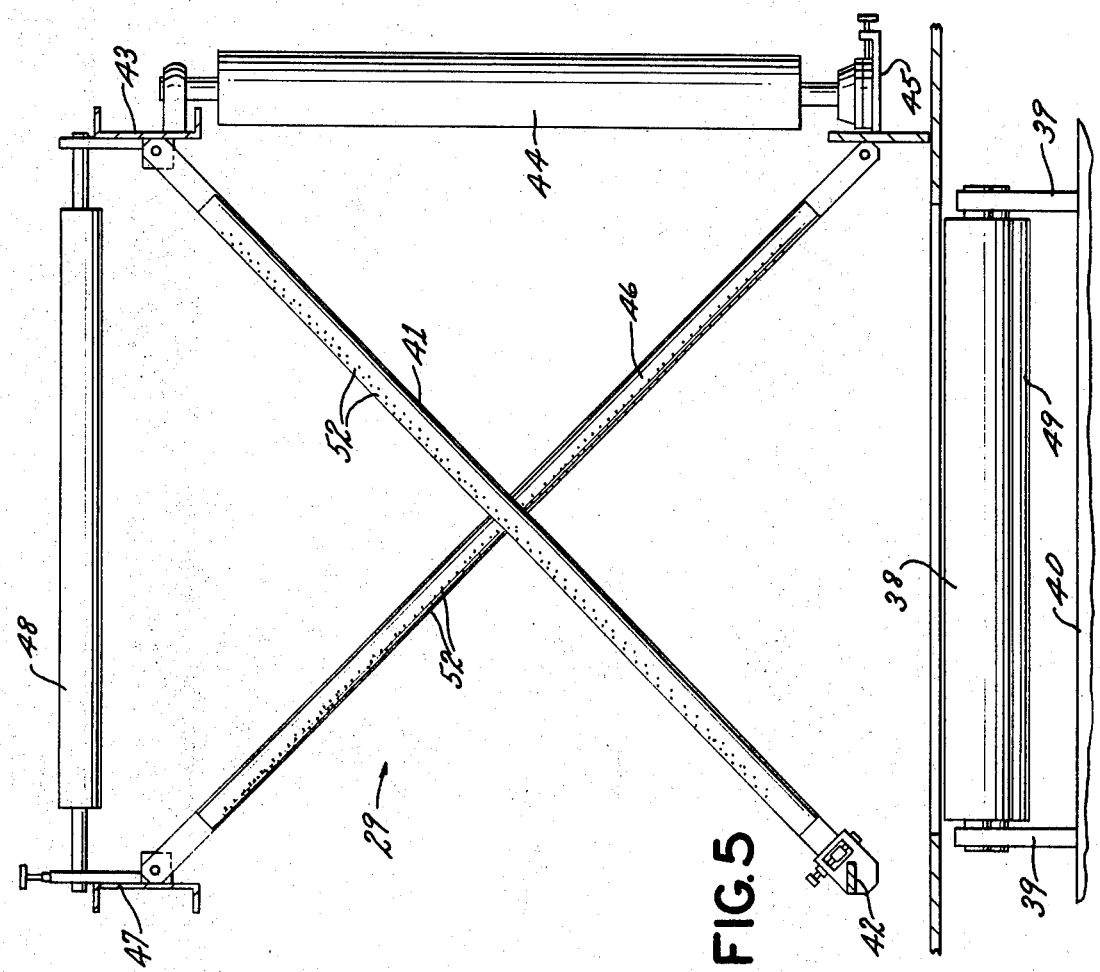
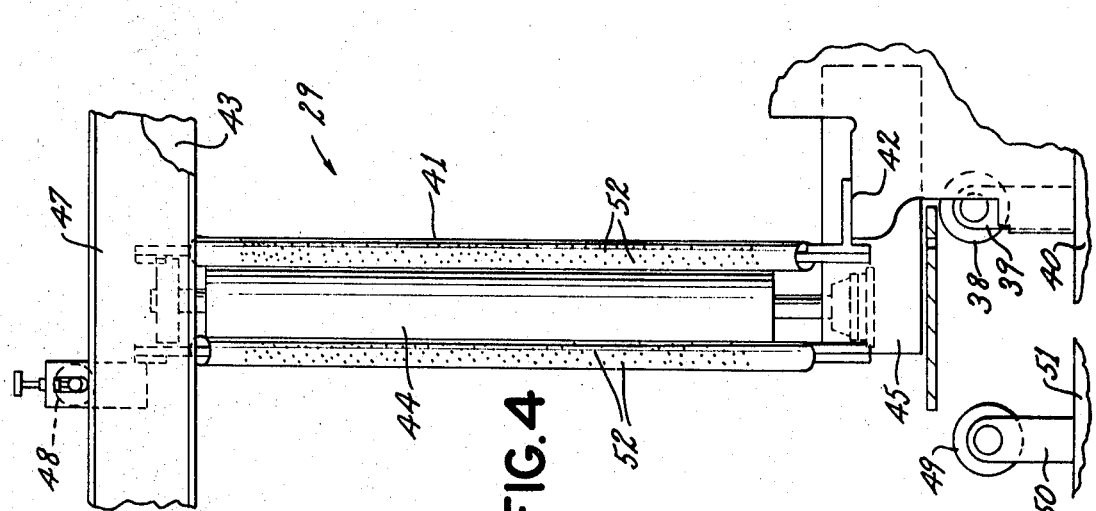

United States Patent Office 3,542,621
Patented Nov. 24, 1970

3,542,621
METHOD AND APPARATUS FOR CONTINUOUSLY LAMINATING A SHEET OF MATERIAL TO EACH SIDE OF ANOTHER SHEET OF MATERIAL
Clinton W. Calhoun, Jr., Henrico County, and Frank B. Hart, Jr., Richmond, Va., and Lloyd C. Eberhard, Jr., Louisville, Ky., assignors to Reynolds Metals Company, Richmond, Va., a corporation of Delaware
Continuation of application Ser. No. 324,704, Nov. 19, 1963. This application July 26, 1968, Ser. No. 749,911
Int. Cl. B32b 31/04; B65h 23/32; C09j 5/00
U.S. Cl. 156—324
17 Claims

ABSTRACT OF THE DISCLOSURE

This disclosure relates to a moisture-barrier packaging material having an intermediate layer of metallic foil secured on opposite sides thereof to a pair of sheets of paper by adhesive means so that the foil sheet is protected by the paper sheets from subsequent scuffing and cracking encountered during the manual and/or machine handling of the packaging material, the packaging material being formed by continuously laminating a first sheet of paper to one side of the metallic foil while that one side is facing in one direction and thereafter continuously turning over the lamination of the two sheets of material so that the other side of the foil sheet faces in that one direction and the second sheet of paper can be continuously laminated to that other side of the foil sheet.

---

This is a continuation of Ser. No. 324,704, filed Nov. 19, 1963, now abandoned.

This invention relates to an improved packaging material or the like as well as to an improved method and apparatus for making such a packaging material or the like.

It is well known that packaging material has heretofore been formed from a lamination comprising metallic foil and porous paper laminated together with a migratory wax-like material so that upon the application of heat, the wax will exude through the porous paper to permit the lamination to be sealed to itself and/or to the other structure by the exuded wax.

However, it has been found that the foil side of the aforementioned prior known packaging material has a tendency to crack and scuff off during handling thereof not only during the packaging operation, but also during the shipping and storing of the packaging material as well as during the shipping and storing of the packaged articles.

It has been found, however, according to the teachings of this invention, that an improved packaging material can be provided which has all of the advantages of the aforementioned metallic foil laminate without any of the disadvantages of the metallic foil side thereof.

In particular, the packaging material of this invention comprises a lamination wherein a pair of sheets of paper or the like are respectively laminated to opposed sides of the sheet of metallic foil so that the sheets of paper protect the metallic foil to prevent the tendency thereof to crack and scuff off as in the prior known packaging material.

Accordingly, it is an object of this invention to provide an improved packaging material having one or more of the novel features set forth above or hereinafter shown or described.

Another object of this invention is to provide an improved apparatus for making such a packaging material or the like.

A further object of this invention is to provide an improved method for making such a packaging material or the like.

Other objects, uses and advantages of this invention are apparent from a reading of this description which proceeds with reference to the accompanying drawings forming a part thereof and wherein:

FIG. 1 is an enlarged, fragmentary, cross-sectional view illustrating one embodiment of the improved packaging material of this invention.

FIG. 2 is a schematic side view illustrating the method and apparatus of this invention for forming the packaging material of FIG. 1.

FIG. 3 is a schematic perspective view illustrating the web turning apparatus of this invention.

FIG. 4 is a side view of a turning apparatus of this invention.

FIG. 5 is an end view of the turning apparatus of this invention.

FIG. 6 is a schematic side view of the turning apparatus of this invention and illustrates the method of fluid greasing the turning mandrels thereof.

While the various features of this invention are hereinafter described as being particularly adaptable for providing the particular packaging material of this invention, it is to be understood that the various features of this invention can be utilized singly or in any combination thereof to provide other materials as desired.

Therefore, this invention is not to be limited to only the embodiments illustrated in the drawings, because the drawings are merely utilized to illustrate one of the wide variety of uses of this invention.

Referring now to FIG. 1, an improved laminated packaging material of this invention is generally indicated by the reference numeral 10 and comprises an intermediate sheet 11 of metallic foil, such as aluminum-containing metallic foil or the like, having its opposed sides 12 and 13 respectively laminated to sheets 14 and 15 of paper by interposed layers of adhesive means 16 and 17.

For example, the sheet of paper 14 can be relatively non-porous and be laminated to the side 12 of the sheet of metallic foil 11 by a conventional glue 16 while the sheet 15 comprises a relatively porous paper laminated to the side 13 of the sheet of metallic foil 11 by a migratory wax-like material 17, such as a microcrystalline wax or the like, whereby upon the application of heat, the wax-like material 17 can exude through the porous paper 15 to cause the same to adhere to any desired surface or structure.

Alternately, the sheet 14 can also comprise porous paper and the adhesive means 16 can comprise a migratory wax-like material similar to the layer 17 or other adhesive means so that upon the application of heat both layers of adhesive 16 and 17 will respectively exude through the porous sheets 14 and 15 while the metallic sheet 11 prevents the migration of the adhesive 16 and 17 in opposite directions.

It has been found that by locating the metallic foil 11 between the outer sheets 14 and 15 of paper or the like, the resulting packaging material 10 has greatly improved machinability and formability than is provided when the metallic foil 11 forms one of the outer layers of the lamination because of the tendency of the foil to crack and scuff off.

Accordingly, it can be seen that this invention provides an improved packaging material having all of the advantages of the prior known packaging material while not having any of the disadvantages of the same.

One method and apparatus of this invention for forming the packaging material 10 is illustrated schematically in FIG. 2 and is generally indicated by the reference numeral 18.

As illustrated in FIG. 18, the strip 11 of metallic foil is fed from a free wheeling supply roll 19 to the left through a glue applying apparatus 20 to be laminated to the strip 14 of paper fed to the left from a free wheeling supply roll 21.

In particular, the strip 11 of metallic foil is fed horizontally from the free wheeling supply roll 19 thereof in such a manner that the side 12 of the strip of material 11 is facing downwardly so that the same can have the layer of glue 16 applied thereto by an adhesive applicator roller 22 receiving the adhesive from a suitable reservoir 23.

Thereafter, the strip 14 of paper is secured to the layer of adhesive 16 by being passed around rolls 24 and 25 whereby the strip 14 of paper is laminated to the strip 11 of the metallic foil as the same pass through the nip of the roll 25 and a back-up roll 26.

Thereafter, the laminated strips of material 11 and 14 are passed vertically upwardly along part of a roller 27 into a drying oven 28 to dry the layer of adhesive 16.

The continuously moving lamination of the sheets of material 11 and 14 passes back out of the drying oven 28 and continuously passes through a turning apparatus 29 of this invention so that as the traveling web of material 11 and 14 passes into a wax applying apparatus 30, the side 13 of the strip of metallic foil 11 is now facing downwardly whereby the layer of wax 17 can be applied thereto by an adhesive applicator roller 31 receiving the wax 17 from a reservoir 32.

The strip of porous paper 15 is fed from a free wheeling supply roll 33 whereby the same passes around rollers 34 and 35 and is laminated to the side 13 of the strip of metallic foil 11 by the layer of the wax 17 as the strips 14, 11 and 15 pass through the nip of the roller 35 and a back-up roller 36.

The thus laminated together strips of material 11, 14 and 15 continuously pass to the left and are drawn onto a rotating wind-up roll or reel 37 whereby continuous rotation of the reel 37 draws the strips of material 11, 14 and 15 through the apparatus 18 to continuously laminate the same together in the manner previously described.

Therefore, it can be seen that a relatively simple method and apparatus is provided by this invention for continuously laminating together the sheets of material 11, 14 and 15 in the manner previously described to provide the improved packaging material 10 of this invention.

The particular details of the web turning apparatus 29 will now be described and reference is made to FIGS. 2–6.

As illustrated, the turning apparatus 29 comprises a first horizontally disposed turning mandrel 38 rotatably mounted on brackets 39 respectively secured to stationary frame structure 40 in the manner illustrated in FIGS. 4 and 5.

The laminated sheets of material 11 and 14 pass under the horizontal mandrel 38 and are directed vertically upwardly by the same until they pass partly around a vertical, diagonal stationary mandrel 41 secured to brackets 42 and 43 in the manner illustrated in FIGS. 4 and 5.

Thus, the upwardly traveling lamination of the sheets of material 11 and 14 is turned sideways by the vertical, diagonal mandrel 41 until the same passes around a vertically disposed turning mandrel 44 rotatably mounted to the frame members 43 and 45.

In this manner, the sideways direction of movement of the lamination 11 and 14 is reversed by the turning mandrel 44 whereby the lamination 11 and 14 is directed to another vertical, diagonal turning mandrel 46 held stationary by the frame members 45 and 47 in the manner illustrated in FIGS. 4 and 5.

Thus, as the lamination 11 and 14 passes around part of the turning mandrel 46, the lamination 11 and 14 is directed vertically upwardly until the same passes around a horizontally disposed turning mandrel 48 rotatably mounted between the brackets 47 and 43 in the manner illustrated in FIGS. 4 and 5.

As the lamination 11 and 14 travels vertically downwardly from the turning mandrel 48, the same is directed to the left in FIG. 2 by another horizontally disposed turning mandrel 49 rotatably supported by brackets 50 mounted to frame structure 51 in the manner illustrated in FIG. 4 whereby the lamination 11 and 14 has been completely reversed so that the side 13 of the sheet of material 11 is facing downwardly as the same passes beyond the turning mandrel 49 while the side 13 was facing upwardly when the lamination passed under the turning mandrel 38.

Thus, it can be seen that the turning apparatus 29 is adapted to readily reverse the facing direction of the traveling web of material passing therethrough without causing a rewinding operation between the glueing apparatus 20 and the waxing apparatus 30.

Since the vertical and diagonal mandrels 41 and 46 are held stationary and are not rotatable in the manner of the other mandrels 38, 44, 48 and 49, the mandrels and 46 can be rendered substantially frictionless to the passage of the web of material there around by a fluid greasing of the mandrels 41 and 46.

In particular, it can be seen in FIGS. 5 and 6 that the mandrels 41 and 46 are substantially hollow and have a plurality of openings 52 provided therein in the region where the web of material engages the same as the web of material passes through the turning apparatus 29.

Fluid pressure is directed to the turning mandrels 41 and 46 at the opposite ends thereof as illustrated by the fluid conduits 53 in FIG. 6 so that fluid can be directed into the interior of the turning mandrels 41 and 46 and be forced out of the openings 52 thereof to fluid grease the mandrels 41 and 46 and render the same substantially frictionless to the travel of the web of material therearound.

Thus, it can be seen that the mandrels 41 and 46 are rendered substantially frictionless by the fluid issuing through the openings 52 thereof and piped therein by the conduit means 53 in FIG. 6.

Accordingly, not only does this invention provide an improved packaging material or the like, but also this invention provides an improved method and apparatus for making such a packaging material or the like.

In addition, this invention provides an improved method and apparatus for reversing the facing direction of a continuously traveling web of material without requiring rewinding of the same.

What is claimed is:

1. An inline apparatus for making a packaging material or the like comprising means for continuously laminating a first sheet of material to one side of a second sheet of material while said one side is facing in one direction, means for continuously turning over said lamination of said two sheets of material so that the other side of said second sheet of material faces in said one direction, and means for continuously laminating a third sheet of material to said other side of said second sheet of material while said other side is facing in said one direction.

2. An inline apparatus as set forth in claim 1 wherein said first-named means includes means to apply adhesive means to said one side of said second sheet of material before said first sheet of material is secured thereto by said adhesive means.

3. An inline apparatus as set forth in claim 1 wherein said last-named means includes means to apply adhesive means to said other side of said second sheet of material before said third sheet of material is secured thereto by said adhesive means.

4. An inline apparatus as set forth in claim 1 and including a drying means between said first-named laminating means and said turning means to dry said first and second laminated sheets of material.

5. An anline apparatus as set forth in claim 1 wherein said turning means includes a pair of diagonally disposed turning mandrels.

6. An inline apparatus as set forth in claim 1 wherein said means for continuously laminating together said first sheet of material to said one side of said second sheet of material takes place while said one side thereof is facing downwardly, said means for continuously turning over said lamination of said first sheet of material and said second sheet of material takes place so that the other side of said second sheet of material is facing downwardly, said means for continuously laminating said third sheet of material to said other side of said second sheet of material takes place while said other side is facing downwardly.

7. An inline apparatus as set forth in claim 6 wherein said turning means includes a pair of diagonally disposed vertical turning mandrels.

8. An inline apparatus as set forth in claim 1 wherein said means for continuously turning over said lamination of said two sheets of material comprises a first mandrel for directing said laminated sheets upwardly, a vertical and diagonal second mandrel for directing said laminated sheets sideways, a vertical third mandrel for directing said laminated sheets sideways in the opposite direction, a vertical and diagonal fourth mandrel for directing said laminated sheets upwardly, a horizontal fifth mandrel for directing said laminated sheets downwardly, a horizontal sixth mandrel for directing said laminated sheets in a horizontal direction with the other side of said second sheet facing downwardly.

9. An inline apparatus as set forth in claim 8 wherein said vertical and diagonal mandrels are fluid greased.

10. A method for making a packaging material or the like, comprising the steps of continuously laminating a first sheet of material to one side of a second sheet of material while said one side is facing in one direction, continuously turning over said lamination of said two sheets of material so that the other side of said second sheet of material faces in said one direction, and continuously laminating a third sheet of material to said other side of said second sheet of material while said other side is facing in said one direction.

11. A method for making packaging material or the like as set forth in claim 10 and including the step of applying adhesive means to said one side of said second sheet of material before said first sheet of material is secured thereto by said adhesive means.

12. A method for making a packaging material or the like as set forth in claim 10 and including the step of applying adhesive means to said other side of said second sheet of material before said third sheet of material is secured thereto by said adhesive means.

13. A method for making a packaging material or the like as set forth in claim 10 and including the step of drying said first-named lamination of said two sheets of material before turning over said lamination of said two sheets of material.

14. A method for making a packaging material or the like as set forth in claim 10 and including the step of providing a pair of diagonally disposed turning mandrels to perform said turning step.

15. A method for making a packaging material or the like as set forth in claim 10 wherein said step of continuously laminating together said first sheet of material to said one side of said second sheet of material takes place while said one side thereof is facing downwardly, said step of continuously turning over said lamination of said first sheet of material and said second sheet of material takes place so that the other side of said second sheet of material is facing downwardly, said step of continuously laminating said third sheet of material to said other side of said second sheet of material takes place while said other side is facing downwardly.

16. A method for making a packaging material or the like as set forth in claim 15 and including the step of providing a pair of diagonally disposed vertical turning mandrels to accomplish said turning step.

17. A method for making a packaging material or the like as set forth in claim 10 wherein said step of continuously turning over said lamination of said two sheets of material comprises the steps of directing said laminated sheets upwardly by a first mandrel, directing said laminated sheets sideways by a vertical diagonal second mandrel, directing said laminated sheets sideways in the opposite direction by a vertical third mandrel, directing said laminated sheets upwardly by a vertical diagonal fourth mandrel, directing said laminated sheets downwardly by a horizontal fifth mandrel, and directing said laminated sheets in a horizontal direction with the other side of said second sheet facing downwardly by a horizontal sixth mandrel.

References Cited

UNITED STATES PATENTS

| | | | |
|---|---|---|---|
| 637,419 | 11/1899 | Richmond | 161—220 |
| 2,227,787 | 1/1941 | Laufer | 156—223 X |
| 1,829,886 | 11/1931 | Yates et al. | 156—551 X |
| 2,269,661 | 1/1942 | Gurwick | 161—220 X |
| 2,430,459 | 11/1947 | Farrell et al. | 161—235 X |
| 2,726,979 | 12/1955 | Grant | 161—220 X |
| 2,775,447 | 12/1956 | Stirn et al. | 270—52 |
| 2,948,650 | 8/1960 | Jackson et al. | 156—62.2 X |

JOHN T. GOOLKASIAN, Primary Examiner

C. B. COSBY, Assistant Examiner

U.S. Cl. X.R.

156—313, 324, 199, 334, 336, 459, 499, 547, 551, 555; 161—223, 235; 226—197

Dedication 3,542,621.—*Clinton W. Calhoun, Jr.*, Henrico County, and *Frank B. Hart, Jr.*, Richmond, Va., and *Lloyd C. Eberhard, Jr.*, Louisville, Ky. METHOD AND APPARATUS FOR CONTINUOUSLY LAMINATING A SHEET OF MATERIAL TO EACH SIDE OF ANOTHER SHEET OF MATERIAL. Patent dated Nov. 24, 1970. Dedication filed May 26, 1972, by the assignee, *Reynolds Metals Company*.

Hereby dedicates to the Public the entire above-identified patent.

[*Official Gazette September 19, 1972.*]